US012770313B1

(12) United States Patent
Nguyen et al.

(10) Patent No.: US 12,770,313 B1
(45) Date of Patent: Oct. 20, 2026

(54) CONTROL OBJECT FOR CURVE-BASED ANIMATION

(71) Applicant: PIXAR, Emeryville, CA (US)

(72) Inventors: Duc Nguyen, Oakland, CA (US); Jeremie Talbot, Kentfield, CA (US); William F. Sheffler, Lafayette, CA (US); Mark C. Hessler, Oakland, CA (US); Kurt Fleischer, Piedmont, CA (US); Fernado De Goes, Kensington, CA (US)

(73) Assignee: PIXAR, Emeryville, CA (US)

( * ) Notice: Subject to any disclaimer, the term of this patent is extended or adjusted under 35 U.S.C. 154(b) by 240 days.

(21) Appl. No.: 18/651,363

(22) Filed: Apr. 30, 2024

(51) Int. Cl.
*G06T 13/40* (2011.01)
*G06T 17/20* (2006.01)
*G06T 19/20* (2011.01)

(52) U.S. Cl.
CPC .............. *G06T 13/40* (2013.01); *G06T 17/20* (2013.01); *G06T 19/20* (2013.01); *G06T 2200/24* (2013.01); *G06T 2207/20101* (2013.01); *G06T 2219/2016* (2013.01); *G06T 2219/2021* (2013.01)

(58) Field of Classification Search
CPC ......... G06T 19/20; G06T 13/20; G06T 13/40; G06T 2219/2021; G06T 2219/2016; G06T 2207/20101; G06T 2207/20096
See application file for complete search history.

(56) References Cited

U.S. PATENT DOCUMENTS

| | | | | |
|---|---|---|---|---|
| 2013/0076619 A1* | 3/2013 | Carr | G06T 19/20 | 345/156 |
| 2014/0267252 A1* | 9/2014 | Hutchinson | G06T 13/20 | 345/420 |
| 2017/0109017 A1* | 4/2017 | Walkin | H04W 4/60 | |
| 2018/0025525 A1* | 1/2018 | Hessler | G06T 19/20 | 345/420 |
| 2019/0197771 A1* | 6/2019 | Batra | G06T 17/20 | |

OTHER PUBLICATIONS

De Goes F, Sheffler W, Fleischer K. Character articulation through profile curves. ACM Transactions on Graphics (TOG). Jul. 22, 2022;41(4):1-4. (Year: 2022).*

(Continued)

*Primary Examiner* — King Y Poon
*Assistant Examiner* — Vincent Peren
(74) *Attorney, Agent, or Firm* — Kilpatrick Townsend & Stockton LLP

(57) ABSTRACT

Systems and methods configure animation using profile curve controls. A set of profile curves defining a surface of an item are obtained and displayed on a user interface. Based on detecting the selection of a point on the set of profile curves, a control object configured for deforming the set of profile curves is generated, the control object being associated with the point, a plurality of translation values, and a plurality of rotation values. Based on detecting user interaction with the control object, the set of profile curves is deformed by applying changes to one or more of the plurality of translation values and the plurality of rotation values. Based on the deformation of the set of profile curves, a corresponding surface mesh is deformed for generating an animation of the item.

18 Claims, 11 Drawing Sheets

(56) References Cited

OTHER PUBLICATIONS

Catmull et al., "Recursively generated B-spline surfaces on arbitrary topological meshes", In Seminal graphics: pioneering efforts that shaped the field, 1998, 183-188.
De Goes et al., "Character articulation through profile curves", ACM Transactions on Graphics vol. 41, No. 4, 2022, 1-14.
Halstead et al., "Efficient, fair interpolation using Catmull-Clark surfaces", In Proceedings of the 20th annual conference on Computer graphics and interactive techniques, Sep. 1993, 35-44.
Nguyen et al., "Shaping the Elements: Curvenet Animation Controls in Pixar's Elemental", In ACM SIGGRAPH 2023 Talks, 2023, 2 pages.
Tao et al., "Mandoline: Robust Cut-Cell Generation for Arbitrary Triangle Meshes", ACM Transactions on Graphics vol. 38, No. 6, 2019, 1-17.

* cited by examiner

CONTROL OBJECT FOR CURVE-BASED ANIMATION

BACKGROUND

This disclosure relates to computer animation and computer-generated imagery. More specifically, this disclosure is related to techniques for controlling animation using user-friendly and computationally efficient curve controls.

With the wide-spread availability of computers, animators and computer graphics artists can rely upon computers to assist in the animation and computer-generated imagery (CGI) process. This may include using computers to have physical models be represented by virtual models in computer memory. This may also include using computers to facilitate animation, for example, by the designing, posing, deforming, coloring, painting, or the like, of characters or other elements of a computer animation display.

One core functional aspect of computer graphics is to convert geometric and/or mathematical descriptions of objects into images. This process is known in the industry as "rendering." For movies, other animated features, shorts, and special effects, a user (e.g., a skilled computer graphics artist) can specify the geometric or mathematical description of objects such as characters, props, backgrounds, or the like, as models to be used in the rendered image or animation sequence. In some instances, the geometric description of an object may include a number of animation control variables (avars) and values for the avars. An animator may also pose the objects within the image or sequence and specify motions and positions of the objects over time to create an animation.

In a process called rigging, models can be given various controllers, animation variables, and handles for an animator to manipulate various locations of the object's topology to create complex movements and motions. For some models, a bone/joint system can be set up to deform various locations of the object's topology. For example, the bone/joint system can be connected to foot, ankle, knee, hip, and other leg locations of a humanoid model to provide the structure to make the humanoid model walk. Other types of information may also be "hung" on the object's topology to add further realism or additional control for the animator. In other words, information may be associated with a vertex, edge, span, or face of the mesh that forms to the object's topology. However, the above processes can be very involved and time-consuming to simply generate a single model. In particular, manually building a rig at every point to be manipulated is extremely time-consuming and compute intensive.

Accordingly, what is desired are improved methods and apparatuses for solving some of the problems discussed above, while reducing further drawbacks, some of which are discussed above.

BRIEF SUMMARY

In various embodiments, a set of curves is established over the surface of an item to be animated. The shape of the curves can be manipulated by an animator to apply edits to the shape and/or position of the item. An animator can create a control object on the fly that can be used to apply the edits. The animator can select a point on the set of curves, and the system can generate a control object to control transformation and rotation from that point. This control object can be associated with tunable variables such as translations and rotations in different directions. These edits can be applied to the set of curves to create a shape change.

In some embodiments, a method for providing an animation control includes obtaining a set of profile curves defining a surface of an item, displaying the set of profile curves on a user interface, detecting, via the user interface, a selection of a point on the set of profile curves. Based on detecting the selection of the point, a control object configured for deforming the set of profile curves is generated, the control object being associated with the point, a plurality of translation values, and a plurality of rotation values. A user interaction with the control object is detected. Based on the user interaction with the control object, the set of profile curves is deformed by applying changes to one or more of the plurality of translation values and the plurality of rotation values. Based on the deformation of the set of profile curves, a corresponding surface mesh is deformed for generating an animation of the item.

In some aspects, the profile curves comprise a set of cubic Bézier splines. In some aspects, the control object is further associated with a plurality of scale values.

In some aspects, the user interaction with the control object comprises dragging a handle of the control object to a desired position. In some aspects, the user interaction with the control object comprises rotating a handle of the control object to rotate a tangent point around the point.

In some aspects, the method further includes displaying the updated plurality of translation and rotation values via the user interface In some aspects, the user interface is a graphical user interface that displays the item, the control object, a name of the point, the plurality of translation values, and the plurality of rotation values.

In some aspects, the control object includes a set of tangent bars terminating in tangent points.

In some aspects, the control object is generated in real time upon detecting selection of the point.

These and other embodiments of the invention are described in detail below. For example, other embodiments are directed to systems, devices, and computer readable media associated with methods described herein.

A further understanding of the nature and the advantages of the inventions disclosed herein may be realized by reference of the remaining portions of the specification and the attached drawings.

BRIEF DESCRIPTION OF THE DRAWINGS

In order to more fully understand the present invention, reference is made to the accompanying drawings. Understanding that these drawings are not to be considered limitations in the scope of the invention, the presently described embodiments and the presently understood best mode of the invention are described with additional detail through use of the accompanying drawings.

DETAILED DESCRIPTION

Techniques and tools can be implemented that assist in the production of computer animation and computer graphics imagery. A set of curves, or a "curvenet" can be established over the surface of an item to be animated. An animator can create a control object that can be used to apply edits such as changing the shape and/or position of the item. The control object can be created automatically and in real time on a point selected by the animator. The animator can select a point on the set of curves, and the system generates a control object to control transformation and rotation from that point. This control object can be associated with tunable variables such as translations and rotations in different directions. Edits received via the control object can be applied to the curvenet, and in turn translated to a surface mesh to modify the mesh according to the modifications to the curvenet.

The techniques described herein can greatly improve the efficiency of applying animation controls. In prior systems, traditional rigging techniques were used to manage controls, which is time consuming, bespoke, and computationally expensive due to the large amount of nodes involved. Using the curvenet animation control techniques described herein greatly streamlines the process by eliminating the need to manually create complex rigs to apply edits. Instead, a control object is generated on the fly and used to modify a curvenet from desired points.

I. Curvenets

In some aspects, curvenets are used to configure animation variables. A curvenet is a collection of 3D curves that can intersect each other. The curves represent characteristic profiles of a surface mesh to be articulated.

Figure 1:
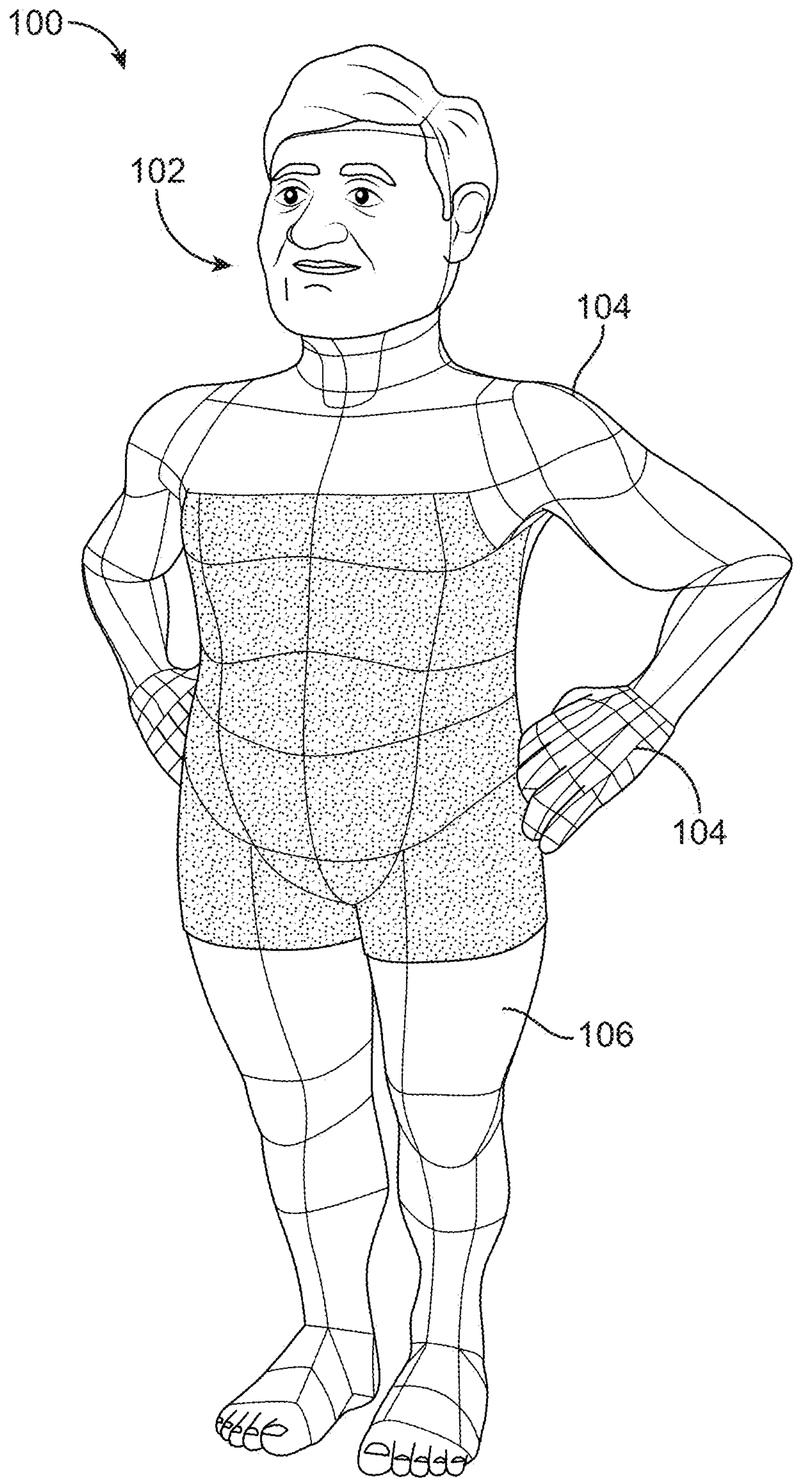
FIG. 1 illustrates example curvenets according to some embodiments.

FIG. 1 illustrates an example image 100 including curvenets, according to various embodiments. An item 102 (in this example, a human character) includes a three-dimensional surface. The surface is defined by a mesh 106 and a comparatively coarse set of curves defining a curvenet 104.

The curvenets can be generated based on cubic Bézier splines, as configured by a user. Alternatively, or additionally, the curvenets curvenets can be based on Catmull-Rom splines, Centripetal Catmull-Rom splines, B-splines, and/or linear curves. In some aspects, the curvenets can have open endpoints, which is a point incident to a single curve. The curvenets can include intersections of arbitrary valence, i.e., a point incident to multiple curves. The curvenets can include multiple connected components, such as when a curvenet has multiple parts not sharing any point. Further, the curves making up the curvenet do not need to be aligned to mesh edges or embedded onto the underlying surface. This helps to support flexible designs, and the curvenets do not depend on the mesh connectivity and the surface topology. As shown in FIG. 1, the curves cross the mesh to delineate deformation profiles, indicating the outline of the mesh deformation. Some regions are surrounded by but may not necessarily include any curves of the curvenet (e.g., the face and the knee as shown in FIG. 1).

In some aspects, the curves are constructed using a modeling interface. A surface mesh is provided in a natural pose. A user can then interact with the interface, prompting the system to generate a profile curve. The profile curves lie near the surface mesh but are not explicitly attached to the mesh. In some aspects, the surface mesh is more dense than the first set of curves.

The computer system can generate the set of profile curves using a modeling interface based on cubic Bézier splines. Bézier curves are defined using a set of "knots," or control points. In the case of cubic Bézier splines, the knots include the end points of the curve. For each of the end points, an additional knot is established such that the curve is tanget at the endpoint to a vector pointing to the additional knot. These knot points control the shape of the curve, and the splines are specified by these knot points. This results in a smooth parametric curve that can be used as a function of time to control animation.

Once the curvenet is modeled, each endpoint shared by three or more splines can be identified and established as an intersection. Endpoints incident to a single spline are established (i.e., labeled) as anchors. Using these labeled endpoints, the curvenet is rearranged by grouping splines into curves, each one formed by a sequence of connected splines bridging between intersections and/or anchors. Any remaining splines connected solely by unlabeled endpoints are identified, forming isolated closed curves. A list is computed, which maps each intersection to the curves emanating from that intersection. In some instances, the curves are sorted counter-clockwise based on their corresponding tangent vectors projected orthogonal to the normal of the closest surface point in a neutral pose.

Points on the curvenet can be sampled. For example, given the established control points, the curvenet shape is approximated by converting its cubic Bézier splines into polylines with evenly spaced sample points. Each spline is first refined uniformly in parametric space and then resampled evenly based on arc-length. In some implementations, the number of samples inside each spline is set to a user-specified value multiplied by the ratio between the length of the polyline connecting the spline's control points and the mean edge length of the underlying surface mesh, both calculated in a neutral pose. Alternatively, or additionally, the number of samples in each spline is set to a default value, such as 5. Using this sampling strategy, a piecewise-linear representation of the curvenet with resolution proportional to the size of surface mesh elements and adaptive to the length of the undeformed splines is obtained.

In some instances, the normal is computed at intersections of the curves. Along a piecewise-linear curve, the sample positions are used to calculate the unit tangent vector $t_s$ and the length $l_s$ for each segment s, where a segment is a pair of consecutive sample points within a curve of the discretized curvenet. In some cases, the individual curves are not sufficient to estimate a normal orientation or a width for any curve segment. To address this issue, the intersection points and their precomputed list of incident curves available in the curvenet are used. An ordered list of tangent vectors and lengths for the segments $\{s_i\}$ emanating from an intersection point is given by $\{(t_i, l_i)\}$. For every corner of consecutive tangents at an intersection, a corner vector is defined as $c_i=t_i\times t_i+1$. A corner normal is set to $m_i=$ $$c_i/\|c_i\|.$$

In the special case of a corner with parallel tangents (e.g., at T-junctions), the degenerate normal can be resolved by including adjacent corners via $$m_i=(c_{i+1}+c_{i-1})/\|c_{i+1}+c_{i-1}\|. \quad [1]$$

These corner normals provide two normal candidates to every segment outgoing an intersection. The normal vector $$n_i^+=m_i$$

is assigned to the left side and the normal vector $$n_i^-=m_{i-1}$$

is assigned to the right side of each segment $s_i$ at an intersection.

The width can be computed at intersections of the curves. The alignment between tangent vectors in each intersection corner is used to estimate a width per segment side, thus implicitly describing curvenets as a net of ribbons with a scale along and across its segments. The width for the left side of the segment $s_i$ is set to $$w_i^+=l_i+\|c_i\|(l_{i+1}-l_i). \quad [2]$$

The width for the left side of the segment is set to $$w_i^-=l_i+\|c_i\|(l_{i-1}-l_i). \quad [3]$$

The width in each segment side is a positive scale with an anisotropy relative to the segment length proportional to the length difference and the orthogonality of its intersection corner.

In some instances, the normal and width are interpolated from the intersection segments to each side of their corresponding curves. For clarity, the left (+) and right (−) superscripts are omitted from the following discussion. However, it should be noted that the interpolation scheme applies to both curve sides. For a curve made of k segments with one end at an intersection and the other end at an anchor, the normal is parallel transported starting at the intersection from a segment $s_i$ to the next segment $s_{i+1}$ using the smallest rotation matrix $R_i$ mapping $t_i$ to $t_{i+1}$. The normal $n_i$ at the segment $s_i$ can be expressed in terms of the normal $n_1$ from the intersection segment $s_1$, i.e., $n_i=\Omega_i n_1$, where $$\Omega_i=\prod_{j=1}^{i-1}R_j$$

indicates the accumulated rotation along the curve up to the segment $s_i$. Since this curve ends at an anchor, the width can be copies from the intersection segment to every other segment, thus producing a uniform width along each curve side. When a curve has intersections at both ends, the normal $\Omega_k n_1$ of the last segment $s_k$ computed through parallel transport may not match the normal $n_k$ estimated at the intersection corner. This discrepancy amounts to the torsion induced by the curvenet shape over the curve, and the total torsion angle is given by $$\theta=\operatorname{atan}\big((\Omega_k n_1)^t(n_k\times t_k)/(\Omega_k n_1)^t n_k\big). \quad [4]$$

To blend the torsion along the curve, the normalized curve arc-length is computed as $$\alpha_i=\left(\sum_{j=1}^{i-1}l_j\right)/\left(\sum_{j=1}^{k}l_j\right) \quad [5]$$

for each segment $s_1$, and the torsion matrix $\theta_i$ is established as the rotation by the angle $\alpha_i\theta$ around the tangent vector $t_i$. The interpolated normal at segment $s_i$ is then assigned to $n_i=\theta_i\Omega_i n_1$. The arc-length values are used to interpolate the width for each segment $s_i$, yielding $$w_i=(1-\alpha_i)w_1+\alpha_i w_k. \quad [6]$$

To complete the frame with axis-aligned scales per segment $s_i$, the width $w_i$ is associated with the binormal vector $b_i=n_i\times t_i$ and the geometric mean $$h_i=\sqrt{l_i w_i}$$

is set to be the scale along the normal vector $n_i$. In some aspects, these axis vectors are arranged into the columns of an orthonormal matrix $B_i=[t_i b_i n_i]$. The respective axis-aligned scales are arranged into a diagonal matrix $S_i=\mathrm{diag}([l_i, w_i, h_i])$. The scaled frame per segment $s_i$ is defined as the matrix $B_i S_i$.

II. Pipeline for Curvenet-Based Animation

Figure 2:
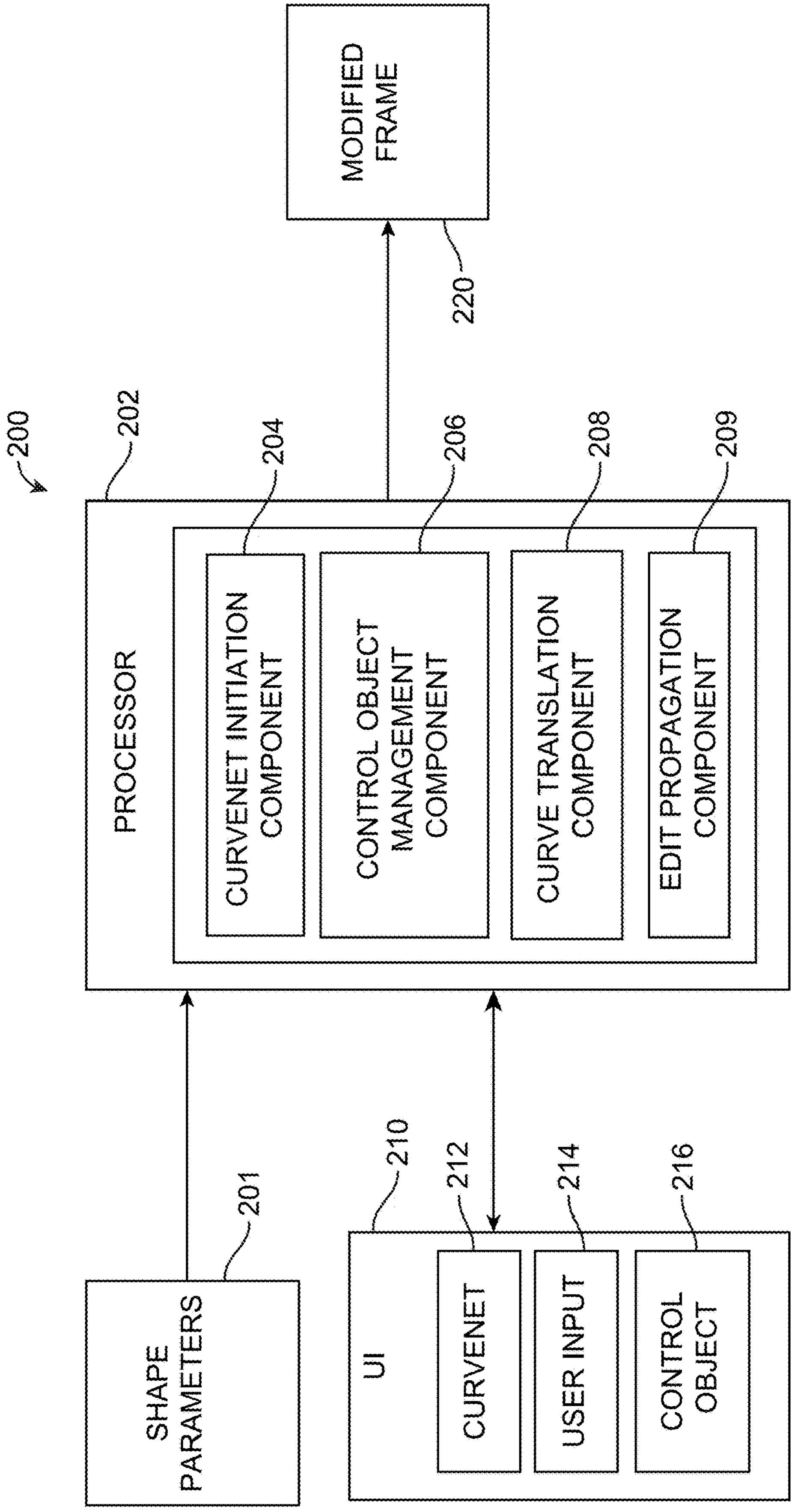
FIG. 2 is a simplified block diagram of an example of a system for curvenet control for animation according to some embodiments.
Figure 10:
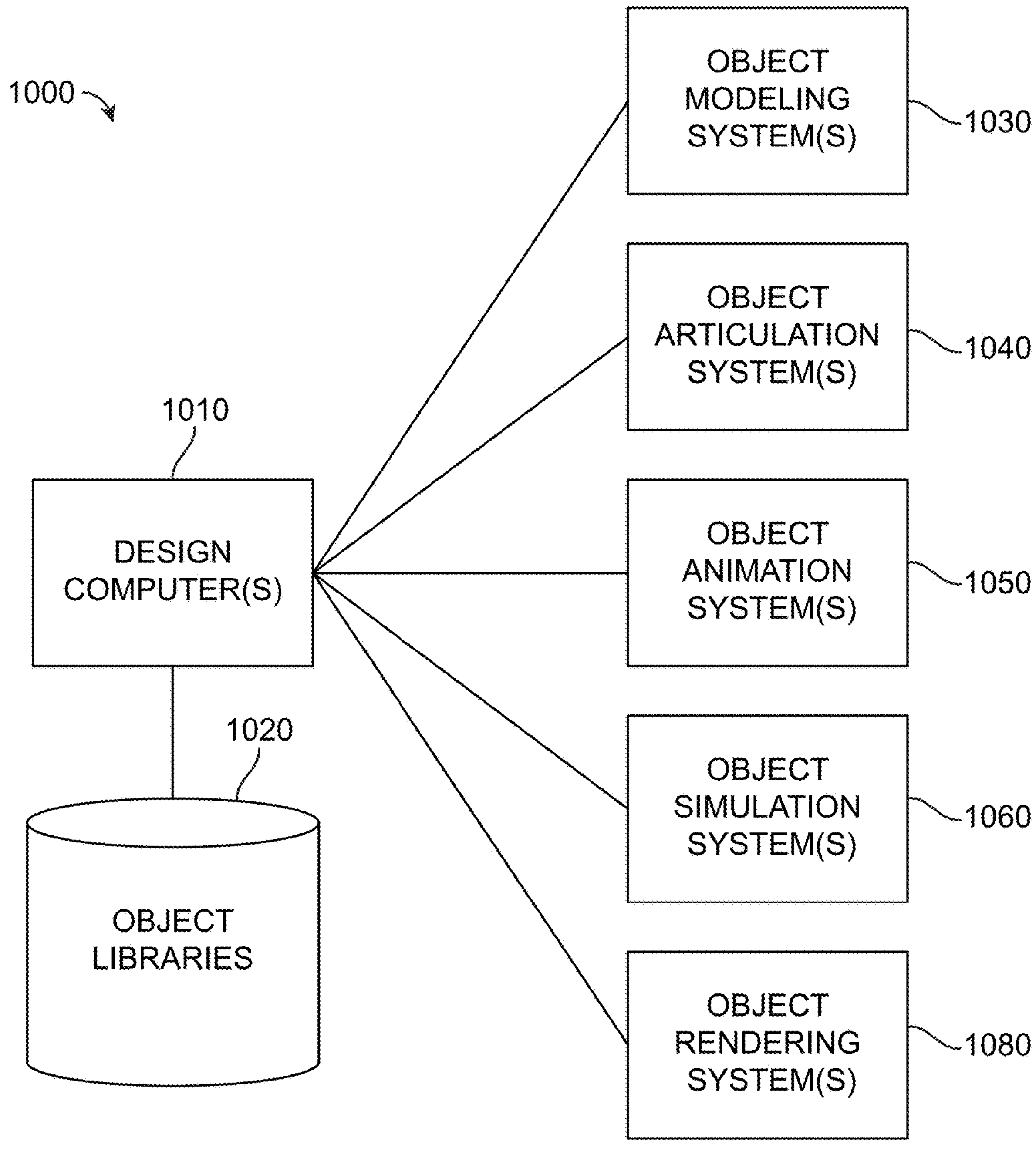
FIG. 10 is a simplified block diagram of a system for creating computer graphics imagery (CGI) and computer-aided animation that may implement or incorporate various embodiments of the present invention.
Figure 11:
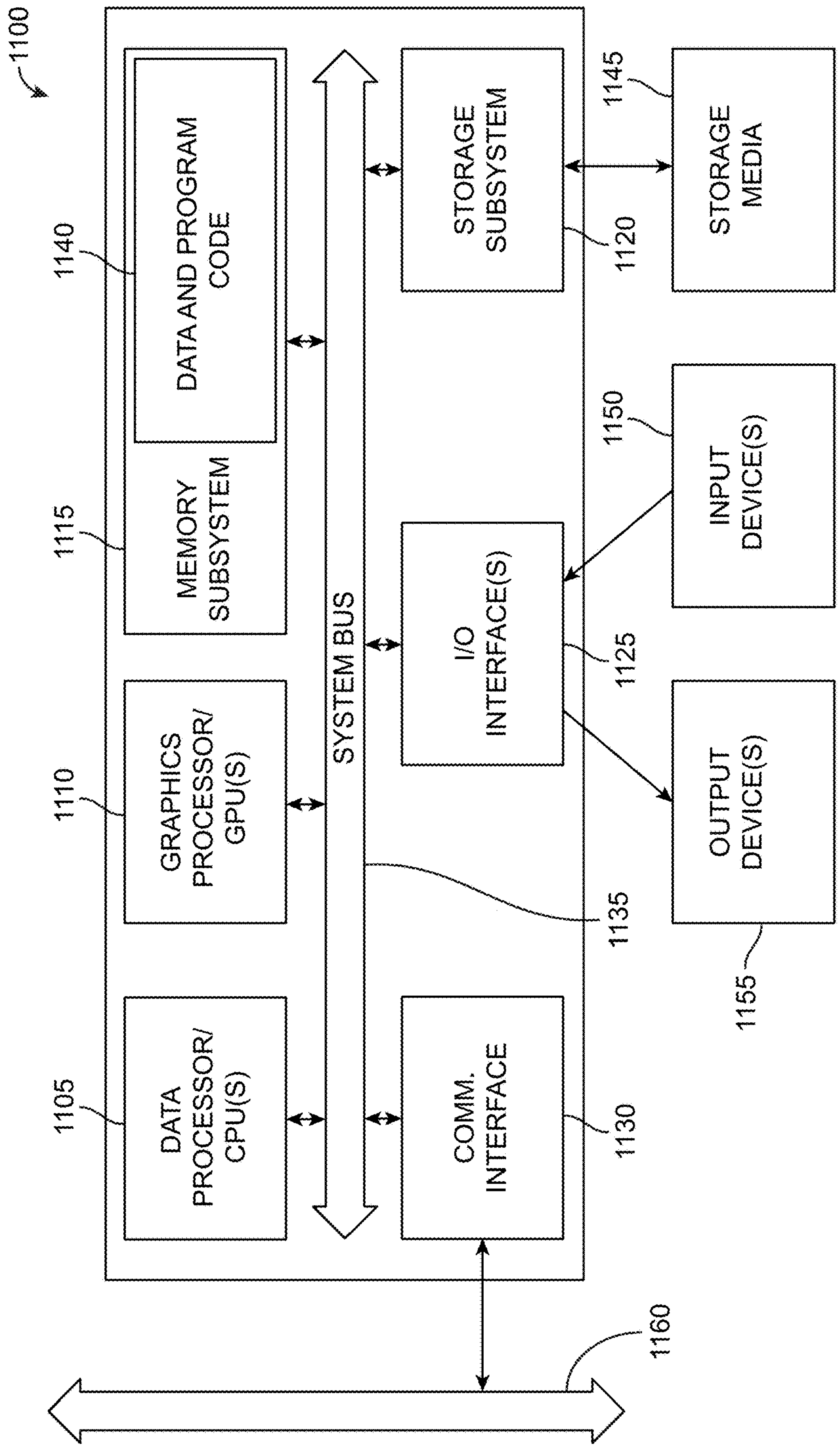
FIG. 11 is a block diagram of a computer system or information processing device that may incorporate an embodiment, be incorporated into an embodiment, or be used to practice any of the innovations, embodiments, and/or examples found within this disclosure.

FIG. 2 is a simplified block diagram of a computer system 200 for creating computer graphics imagery (CGI) and computer-aided animation using curvenet controls, according to various embodiments. As shown, the computer system 200 can include a processor 202 configured to implement computer program components, which can include a curvenet generation component 204, a control object management component 206, a curve translation component 208, and an edit propagation component 209. The processor is coupled to a user interface (UI) 210 for configuring and displaying the animation controls. In some implementations, the computer system 200 is part of, or coupled to, systems for animating and rendering objects, as shown in FIGS. 10 and 11. The computer system 200 and its functions may accordingly be part of an overall animation pipeline as further described below with respect to FIGS. 10 and 11.

The processor 202 may receive shape parameters 201 as input. In some examples, the shape parameters 201 include a polygonal mesh defining a surface of an item to be animated. As examples, the item to be animated can be a human or animal character or another item such as a car, a tree, a piece of furniture, etc. In some instances, the item is a character and the shape parameters (e.g., surface mesh) define body parts of the character. The shape parameters 201 may be received from another component that is included in, or communicatively coupled to, the computer system 200 (e.g., the object modeling system 1030, as described in further detail below with respect to FIG. 10).

The UI 210 is a graphical user interface that includes elements for displaying animation-related imagery and receiving user input 214. For example, the animation-related imagery includes a representation of an item, such as a surface mesh and/or surface texture. Overlayed on the item representation are one or more curves comprising a curvenet 212. The user input 214 can include selecting a point on the curvenet 212 and/or manipulating such a point. Upon detecting interaction with the point on the curvenet 212, the computer system 200 generates a control object 216. The control object 216 is an object for controlling the position and orientation of a point on the curvenet. . . . Changes in the position and orientation of the point on the curvenet will be propagated to the rest of the curvenet.

The curvenet initiation component 204 can obtain a curvenet. For example, the curvenet initiation component 204 can generate a curvenet based on user input and cubic Bézier splines, as described above with respect to FIG. 1. A user can indicate where and how to generate curves, e.g., in different densities around a mouth, eye, head, etc., as shown in FIG. 4. In some implementations, obtaining the curvenet includes computing various parameters that describe the curvenet, including normal and width values as described further below with respect to FIG. 3. Alternatively, or additionally, the curvenet initiation component can retrieve the curvenet from another computing system or another component of the computer system 200.

The control object management component 206 can generate and manage a control object. A control object is an object associated with a set of parameters. The parameters, for example, include translation and rotation values. Based on user input manipulating the control object, the parameters are modified to different translation and rotation values, representing a modified position and orientation of the point on the surface of the item.

In some aspects, the curve translation component 208 is configured to modify the curvenet based on the modified parameters received using the control object. In some implementations, modifying the curvenet includes converting the animation controls established via the control object parameters into world-space transformations by computing an orientation for every curvenet knot, as described further below with respect to FIG. 3.

In some aspects, the edit propagation component 209 is configured to modify the surface mesh according to the modified curvenet. The edits applied to the curvenet are propagated to the mesh. In some aspects, the deformation of the surface mesh induced by the curvenet articulation is approached as a two-step optimization, as described further below with respect to FIG. 3.

In some aspects, based on the modifications applied to the mesh, an image is rendered. This can include applying color, texture, lighting, background, and so forth, based on the configured mesh. This results in a modified frame 220 reflecting the edits applied using the control object.

III. Curvenet Controls

The techniques described herein provide a control object that can be used to apply edits such as changing the shape and/or position of a curvenet defining the shape of an item to be animated. The control object can be created automatically and in real time on a point selected by the animator. A method of configuring animation parameters using a control object is described with respect to FIG. 3. FIGS. 4-8 illustrate examples of control objects and associated curvenets and interfaces.

A. Techniques for Animation Using Curvenet Controls

Curvenet controls provide a way for an animator to select control points where a control object is desired. Responsive to such selection, the system generates a control object automatically and in real time, i.e., on the fly. This control object is associated with parameters describing the position and orientation of the selected point. The animator can manipulate the control object to change the position and orientation of the point. These modifications are propagated to the curvenet to configure items for animation.

1. Curvenet Control Method

Figure 3:
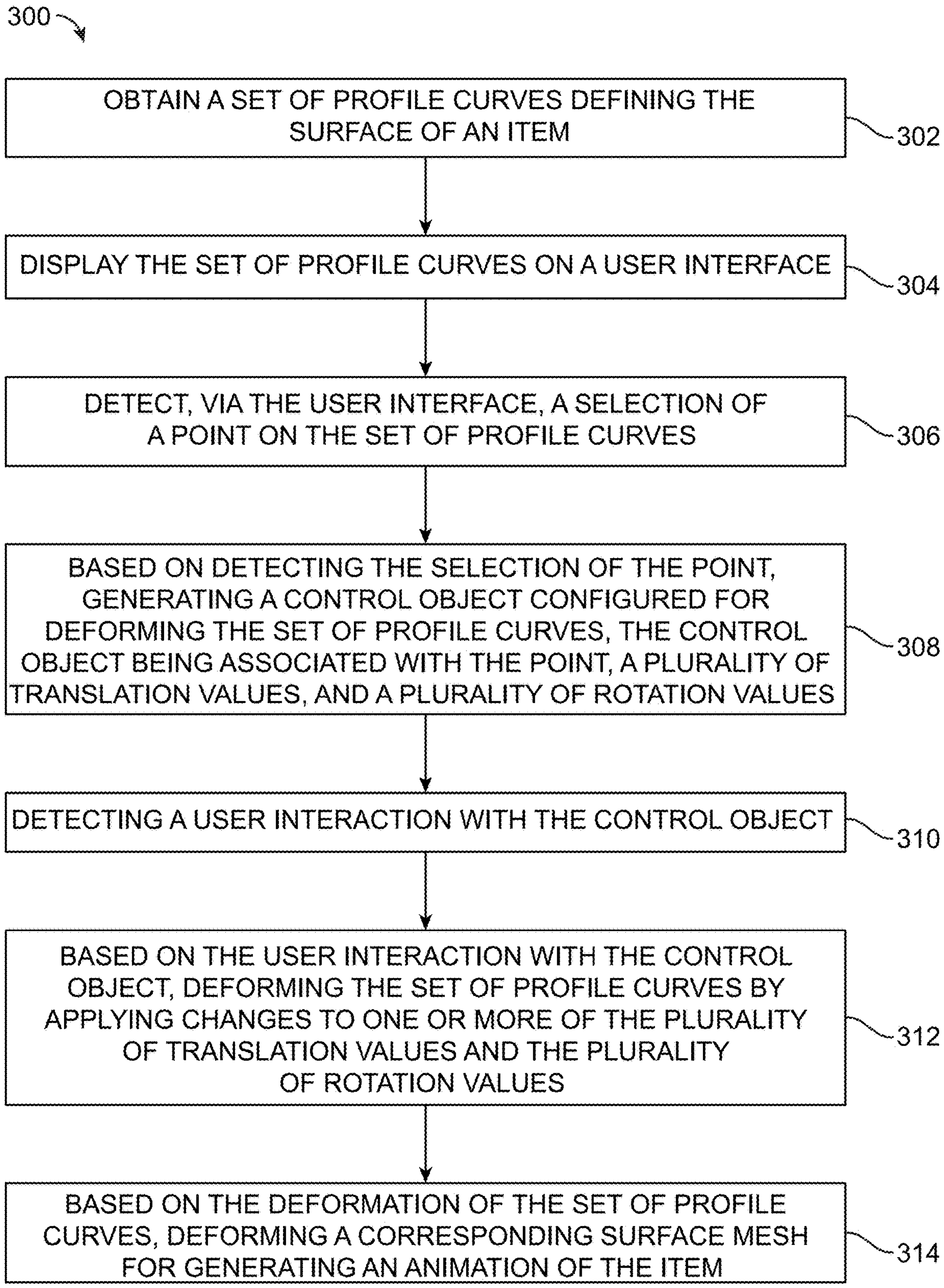
FIG. 3 a simplified flowchart of a method for configuring animation using curvenet controls, according to some embodiments.
Figure 4:
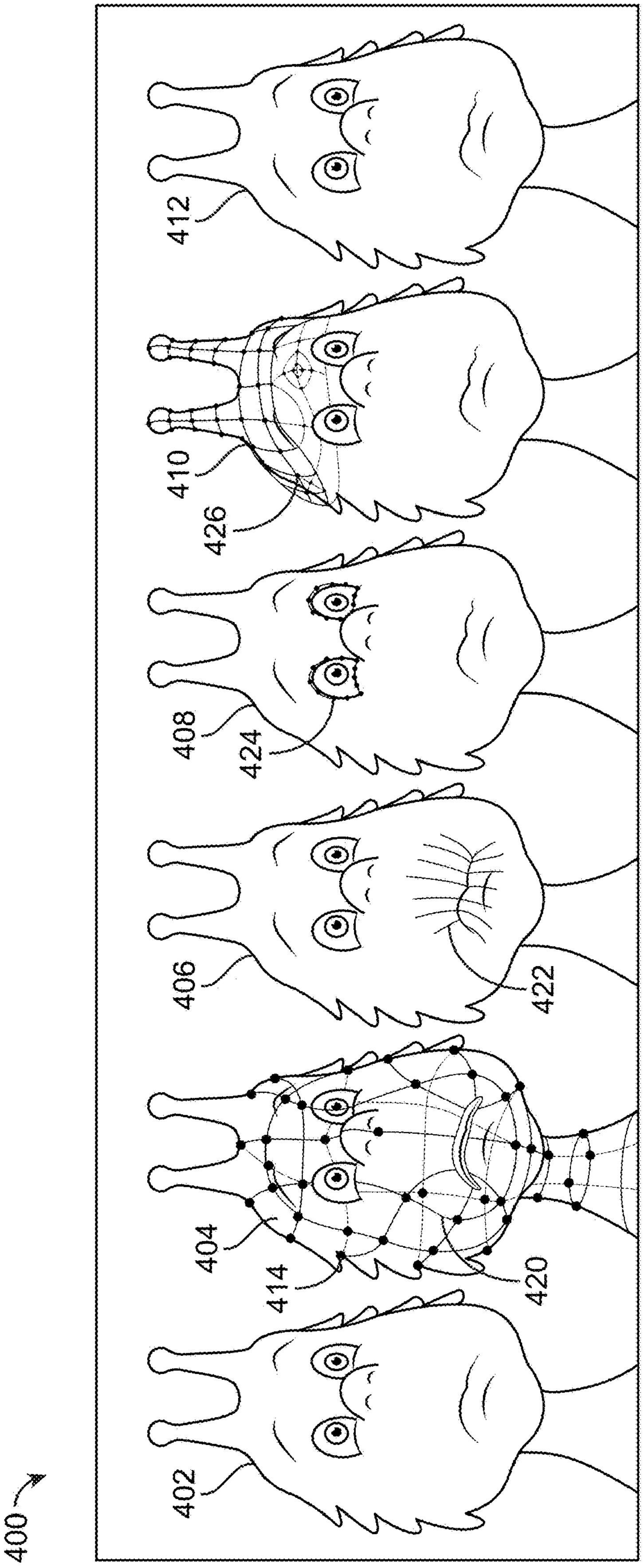
FIG. 4 illustrates curvenet control points as used in the method of FIG. 3 according to some embodiments.

FIG. 3 is a simplified flowchart of a method for animation using curvenet controls according to some embodiments. The method presented in FIG. 3 and described below is intended to be illustrative and non-limiting. It is appreciated that the processing steps may be performed in an order different from that depicted in FIG. 3 and that not all the steps depicted in FIG. 3 need be performed. In certain implementations, the method 300 may be implemented by a computer system, such as the computer system 200 shown in FIG. 2 and/or those shown in FIGS. 10 and 11.

In some embodiments, the method 300 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 300 in response to instructions stored electronically on an electronic storage medium. The one or more processing devices may include one or more devices configured through hardware, firmware, and/or software to be specifically designed for execution of one or more of the operations of method 300.

Prior to step 302, in some examples, the computer system receives or generates information defining the surface of an item. In some embodiments, the computer system 200 depicted in FIG. 2 receives the polygonal mesh from a component coupled to the computer system 200.

In various examples, the information defining the surface of the item can include a polygonal mesh, a set of 3D points, or any other suitable representation. For example, the object modeling system 1030 of FIG. 10 can generate a polygonal mesh and transmit the polygonal mesh to the computer system 200. Polygons can be used to model the objects and their motion.

The polygonal mesh generation process may involve techniques such as non-uniform rational B-splines or NURBS, polygons and subdivision surfaces (or SubDivs), that may be used to describe the shape of the object. A single object may have several different models that describe its shape. In some implementations, a polygonal mesh is initialized by generating a recursively generated B-spline surface, also known as a Catmull-Clark mesh surface. (See Catmull, E. and Clark, J., "Recursively Generated B-Spline Surfaces on Arbitrary Topological Meshes," *Computer-Aided Design* 10, 6 (1978)). The base mesh may then be subdivided into polygons, such as triangles or quadrilaterials, and vertices of the polygons are moved to their limit positions. (See Halstead, M., Kass, M., and Derose, T., "Efficient, Fair Interpolation Using Catmull-Clark Surfaces, *in Proc. SIGGRAPH,* 35-44 (1993)).

As discussed above, the item can be any of various items to be animated, such as a character (e.g., human or animal), vehicle, furniture, etc. An example of one such item, a character, is shown in FIG. 1.

At step 302, the computer system obtains a set of profile curves defining a surface of an item. As noted above, the surface of the item can also be defined by a polygonal mesh. In some instances, the polygonal mesh is relatively dense while the set of profile curves is relatively sparse (e.g., as shown in FIG. 1). As described above with respect to FIG. 1, the set of profile curves, or curvenet, is a collection of 3D curves that represent characteristic profiles of a surface mesh to be articulated. The profile curves can be generated using cubic Bézier splines and/or retrieved from another component, as described above with respect to FIG. 1.

Figure 8:
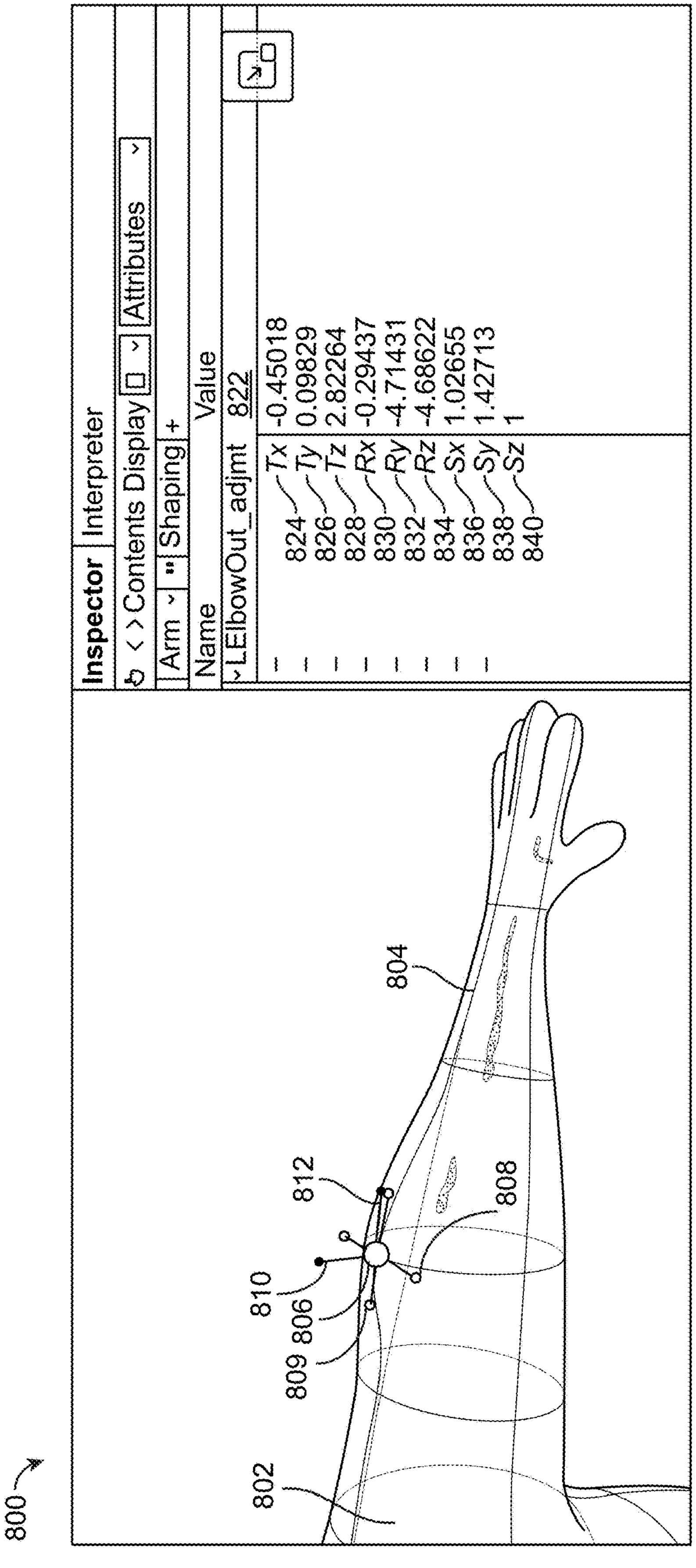
FIG. 8 illustrates an example interface for configuring animation using curvenet controls, according to some embodiments.

At step 304, the computer system displays the set of profile curves on a user interface. The computer system may implement a user interface as described with respect to FIG. 2 and shown in FIG. 8 to show the set of profile curves. In some aspects, the set of profile curves is overlayed on a 3D surface and/or mesh representation of the item, as shown in FIGS. 1 and 8.

At step 306, the computer system detects, via the user interface, a selection of a point on the set of profile curves. For example, a user can indicate a point on a curve using a mouse, touchpad, touchscreen, and or the like. The computer system identifies the selected point.

At step 308, based on detecting the selection of the point, the computer system generates a control object configured for deforming the set of profile curves. The control object is created when the point is selected and includes parameters for configuring a displacement of the point. For example, the control object can be associated with the point, a plurality of translation values, and a plurality of rotation values. The translation values represent linear translation of the point in the x, y, or z direction. The rotation values represent rotation of the point in space. The control object may further be associated with a plurality of scale values. In some implementations, the control object is at a knot of a spline. In some instances, the control object is generated in real time upon detecting selection of the point (e.g., in less than a millisecond).

As a specific example, the control object can have the following parameters:

- Point number being edited
- Translate x, translate y, translate z
- Rotate x, rotate y, rotate z
- Scale x, scale y, scale z
- configurable attributes allowing tangent points to be attached to a parent knot and animated by tangent translate controls.

For a given point, the other parameters establish modified translation, rotation, and scale values. The user can manipulate the control object, by moving it globally and/or adjusting handles of the control object. This causes the parameters to change. For example, if the user drags the control object in the x direction, then the translate x value changes. These parameters are stored in association with the control object. In some examples, the initial translation and rotation parameters are set to 0, and the scale parameters are initially set to 1.0.

Surface-relative curvenet controls are exposed to animators without any manual setup. Advantageously, the curvenet controls, which are automatically generated by the system at a selected point, can serve to propagate curvenet edits into surface deformations without the need for manual rigging. A visual representation of the control object is displayed on the user interface. In some instances, the visual representation of the control object includes handles extending from the point, as shown in FIGS. 5-8.

At step 310, the computer system detects a user interaction with the control object. The user may manipulate the control object by interacting with the handles and applying the desired manipulations. For example, the user interaction with the control object comprises dragging a handle of the control object to a desired position. As a specific example, if the item is a character and the user wishes to make their belly bigger, they would manipulate the control object to move in the desired direction for the associated point to move. As another example, the user interaction with the control object comprises rotating a handle of the control object to rotate a tangent point around the point.

At step 312, based on the user interaction with the control object, the computer system deforms the set of profile curves by applying changes to one or more of the plurality of translation values and the plurality of rotation values. Based on user-configured modification to the control object, the parameters are modified. Continuing the above example, if the user is extending a point on the belly to make it bigger, the translation values and scale values will increase. The computer system stores the modified translation values.

Based on the changes to the control object, the computer system modifies the associated curves. In some instances, the computer system positions the knots and tangents of the curvenets by evaluating the animation controls encoded through the control object. For example, the computer system converts the animation controls established via the control object parameters into world-space transformations by computing an orientation for every curvenet knot. To achieve this goal, a curvenet intersection is identified as any knot shared by three or more curves. The rotation that best fits the tangents incident to each intersection from the original curvenet shape to its warped pose is estimated. For the remaining knots, the parallel transport of the rotation matrices from every nearby intersection is computed. When a knot lies in between two intersections, the transported rotations are blended, weighted by the inverse distance between the knot and each intersection. In some examples, this computation occurs at deformation time. This computation takes into account the result of one or more control object modifications, resulting in an orientation that is relative to the deformed surface.

In some instances, a deformation gradient is computed. Each curve is approximated with a fixed number of evenly spaced samples per spline. These samples define an one-to-one mapping between segments of different curvenet poses. Using this correspondence, the distortion of a deformed curvenet is measured relative to an undeformed configuration. For example, the deformation gradient is evaluated at each segment. In some examples, the deformation gradient is a matrix $F_i$ that quantifies the amount of rotation and stretching deforming a rest segment to its respective posed segment. For curves incident to intersections, the deformation gradient is computed for each side of a segment $s_i$ as the matrix $$F_i = (B_i S_i)\left(\breve{B}_i \breve{S}_i\right)^{-1} \quad [7]$$

that transforms the rest scaled frame $B_iS_i$ to the posed scaled frame $B_iS_i$. In some aspects, the deformation gradient matrix is further expanded using axis vectors and scales, yielding $$F_i = \left(\frac{l_i}{\breve{l}_i}\right)(t_i \otimes \breve{t}_l) + \left(\frac{w_i}{\breve{w}_i}\right)(b_i \otimes \breve{b}_l) + \left(\frac{h_i}{\breve{h}_i}\right)(n_i \otimes \breve{n}_l), \quad [8]$$

where the symbol denotes the outer product between two vectors. The deformation gradient in Equation 7 includes a tangential rotation, a normal twist, and/or non-uniform scaling, all deduced directly from the curvenet representation. Moreover, the matrices for both segment sides share the same tangential transformation but they can have different twisting and non-tangential stretching amounts. In the case of isolated curves, either closed or with both ends at anchors, there is no curvenet structure that complements the tangent and the length of the curve segments. In such cases, the deformation gradient is computed for a segment in these simplistic curves using the smallest rotation from the rest tangent $t_i$ to the posed tangent $t_i$ multiplied by a uniform scaling given by the length ratio $$\frac{l_i}{\breve{l}_i}.$$

At step 314, based on the deformation of the set of profile curves, the computer system deforms a corresponding surface mesh for generating an animation of the item. The computer system applies the changes to the curvenet to the surface mesh. This can involve computing a transformation matrix and applying a two-step optimization process, as described in further detail below. In some aspects, the surface mesh is initially combined with the curvenet or a sampled version thereof in a neutral pose. The combining can include projecting a neutral position for each curvenet sample to a closest point on the surface mesh, as described in further detail below. A deformed surface mesh is then generated based on the deformed curvenet generated at step 310.

Accordingly, deforming the surface mesh based on the deformation of the set of profile curves can include sampling set of points from the set of profile curves (as described above with respect to step 302), combining the surface mesh with the sampled set of points from the set of profile curves in a neutral pose, thereby generating combined mesh and profile curves, and deforming the surface mesh from a neutral pose based on the deformed set of profile curves and the combined mesh and profile curves. This deformation can involve computing an interpolation in a solution space of discrete functions, as described in further detail below.

In some aspects, the computer system combines the surface mesh with the sampled set of profile curves in a neutral pose by precomputing the binding of the piecewise-linear curvenet onto the surface mesh representing the item in a neutral pose. One way to capture the different values estimated from each side is to adapt the cartesian cut-cell method to curved surfaces that cut the input polygonal mesh by tracing curvenet segments. The cartesian cut-cell method is described in Tao et al., *Mandoline: Robust Cut-Cell Generation for Arbitrary Triangle Meshes*, ACM Transactions on Graphics 38, 6, Article 179 (2019). The resulting cut-mesh retains the input mesh vertices as well as the curvenet samples, while splitting the mesh faces into smaller polygons, which can be non-planar, non-convex, or include cracks. The cut-mesh can be using a customized halfedge data structure that annotates halfedges with their corresponding oriented curvenet segments, thus defining a mapping from the cut-mesh to the sampled curvenet. In some aspects, a bitmask is included to encode an indication of whether each cut-vertex refers to a mesh vertex, a curvenet sample, or an intersection between a curvenet segment and a mesh edge. To indicate cracks cutting a polygon, cut-edges can be permitted to branch out of the cut-face boundary with their respective pairs of opposite halfedges both pointing to the same cut-face.

In some aspects, combining the surface mesh with the sampled set of profile curves further includes projecting the neutral position q for each curvenet sample to the closest point p on the surface mesh. Based on the mesh element intersected by the projection, each sample is categorized as a vertex, edge, or face-sample. A numerical tolerance can be used (e.g., of 0.001% of the diagonal length of the surface bounding box) can be used to detect if a projected sample is at a vertex or within an edge. The vertex samples are used to tag the bitmask of their coincident cut vertices. In some aspects, every cut edge containing edge-samples is subdivided by inserting new cut-vertices at their respective projected locations. The face samples are allocated as isolated cut vertices and later connected by curvenet segments. To incorporate the curvenet segments into the cut mesh, the sample-to-mesh categories are used enumerate all possible sample combinations per segment.

In some aspects, the cut-mesh connectivity is updated to identify the split cut-faces produced by the curvenet segments. For example, tangent space is computed for each cut-vertex, projecting its incident halfedges onto the tangent space, and then sorting the projected halfedges counter-clockwise. To compute the tangent spaces, the tangent space for any cut-vertex is set by referring to the corresponding point on the surface mesh.

In some aspects, the cut-mesh is discretized to represent the input surface that conforms to the curvenet. For example, the space of functions defined over the cut-mesh is discretized. Discrete functions can be represented by assigning a scalar value for each corner of a cut-face.

The discrete version of a scalar function ϕ is represented by a vector on of size equal to the number of halfedges nhin the cut-mesh. These values are interpolated linearly along the halfedges forming each cut-face and the discontinuities are indicated by any cut-vertex that reads different values from its incident halfedges.

Given a cut-face f formed by a loop of $n_f$ halfedges, a matrix $X_f$ of size $n_f \times 3$ is assembled, containing the 3D points that define the simple polygon associated with f ordered counter-clockwise, stacked row-wise, and in a neutral pose. In some implementations, the matrix $X_f$ is used to compute a polygonal Laplacian matrix $L_f$ of size $n_f \times n_f$. The cut-mesh Laplacian is defined as the matrix $L_h$ of size $n_h \times n_h$ that gathers the contribution of every cut-face Laplacian $L_f$. The smoothness of a discrete function on is measured over the cut-mesh via the Dirichlet energy:

$$E_D(\phi_h) = \phi_h^t L_h \phi_h. \quad [9]$$

With the goal to compute an interpolation from the curvenet to the input mesh, the solution space of discrete functions is restricted so that discontinuities are imposed as constraints by the curvenet, while mesh vertices are assigned to smooth values shared by their incident halfedges. The cut-vertices are organized into two groups based on their bitmasks. The first group defines the interpolation unknowns represented by every cut-vertex coincident to a mesh vertex. These unknowns are arranged as a vector $\phi_v$ of size $n_v$. A matrix V of size $n_h \times n_v$ that copies values from these cut-vertices to their adjacent halfedges is established. A vector with the values of the curvenet samples estimated from each side of every curvenet segment is established as $\phi_c$. In total, the size $n_c$. of the vector $\phi_c$ is twice the sum of the number of samples per curve. A matrix C of size $n_h \times n_c$ is assembled that maps these sample values to their adjacent halfedges. By combining these terms, the restricted solution space is defined as discrete functions of the form $$\phi_h = V\phi_v + C\phi_c. \quad [10]$$

The cut-mesh discretization can then be used to compute the final shape of the surface mesh based on the deformation of the sampled curvenet.

In some aspects, the deformation of the surface mesh induced by the curvenet articulation is approached as a two-step optimization. Given the undeformed and deformed configurations of the sampled curvenet indicated by their respective sample positions $\hat{q}$ and q, the deformation gradients are deformed from the curvenet segments to the mesh vertices. Next, the vertex positions that best match the interpolated deformation gradients are computed while preserving surface details and reproducing the target curvenet samples.

In the first optimization step, the deformation gradient matrices $$(F_s^+, F_s^-)$$

from each side of every curvenet segment s, as described above. These matrices are remapped from the segments to their incident samples. For a sample inside a curve, its left and right matrices are established by averaging the values from the previous and next segments along the curve. When the sample is a curve endpoint, the computer system makes a copy of the sample for every incident segment and assigns each copy to the values from the left and the right side of the corresponding segment. With these sample-based deformation gradients, the curvenet constraints are established as a matrix $f_c$ of size $n_c \times 9$ that flattens the deformation gradient matrices into row-vectors. The computer system computes the matrix $f_c$ with the flattened deformation gradients at the mesh vertices by solving $$\min f_v E_D(Vf_v + Cf_c). \quad [11]$$

The optimization in Equation 11 produces a harmonic interpolation over the cut-mesh for each column in $f_v$ with discontinuities at the curvenet samples prescribed by $f_c$. The interpolated and constrained matrices $f_v$ and $f_c$ are combined using Equation 10. The computer system computes the deformation gradient for the corner of every cut-face in the cut-mesh. The corner values are averaged within each cut-face f. The resulting row-vector is unfolded back into a 3×3 matrix denoted by Fr. The deformation gradient Fr per cut-face f indicates how the rest configuration $X_f$ of the simple polygon associated with f should be rotated and stretched. Since every halfedge is incident to a single cut-face, the computer system can assemble deformed polygons $$\breve{X}_f F_f^t$$

from every cut-face f into a matrix $y_h$ of size $n_h \times 3$.

The second optimization step identifies new vertex positions that approximate the transformed cut-face polygons given by $y_h$, while enforcing the sample locations constrained by the posed curvenet. In particular, the residual vector defined between each rest sample point q and its projected point p is accounted for so that the deformed surface mesh preserves the offset relative to the deformed curvenet. To this end, the computer system obtains a copy of each curvenet sample with target position $q_i$ and its corresponding deformation gradient matrix $F_i$ indicated by the unfolded i-th row from the constraint matrix $f_c$. The target projected position of the curvenet sample is estimated as $p_i = q_i - F_i(q_i - p_i)$. These adjusted sample points $\{p_i\}$ are rearranged into the rows of the matrix $x_c$ of size $n_c \times 3$representing the curvenet positional constraints. The computer system then computes a matrix of positions $x_v$ for the mesh vertices via $$\min_{x_v} E_D(Vx_v + Cx_c - y_h) \quad [12]$$

Equations 11 and 12 correspond to unconstrained convex optimizations and, therefore, they can be minimized by solving a sequence of linear systems of the form $$\begin{cases} (V^t L_h V) f_v = -V^t L_h (Cf_c), \\ (V^t L_h V) x_v = -V^t L_h (Cx_c - y_h). \end{cases}$$

The shared left-hand side matrix $V^t L_h V$ defines a modified Laplacian operator restricted to the vertices of the input surface mesh that incorporates the contributions of the sub-polygons generated by the mesh cutting with the sampled curvenet, while retaining a one-ring sparsity pattern similar to the original polygonal mesh. Since this Laplacian matrix is assembled only once in the neutral pose, a sparse factorization of this matrix can be computed and used to find the solutions of Equation 13. Thus, in some aspects, deforming the surface mesh based on the deformation of the set of profile curves comprises performing a first optimization step comprising averaging values of successive segments along the set of profile curves and performing a second optimization step comprising identifying new vertex locations.

In some aspects, after aligning the surface mesh with the curvenet, the computer system applies information to the surface mesh to provide functional and/or decorative purposes. The computer system identifies information defined for the item and/or environment, such as textures, lighting, and so forth, and renders an image based on the information and the surface mesh. For example, fields of data and/or variables specifying color, shading, paint, texture, etc., can be located at certain vertices or defined over surfaces of the surface mesh. This can be iterated to produce a series of keyframes used to create an animation including the item.

2. CURVENET CONTROL EXAMPLES

FIGS. 4-9 illustrate examples of curvenets and control objects as used in the method 300 of FIG. 3. The control object provides fine animation controls driven by sparse and modular curvenets that produce detail-preserving surface deformation.

FIG. 4 is a set of images 400 illustrating curvenets and associated controls according to some embodiments. The first image 402 is a character represented by a surface mesh (without curvenets). In the second image 404, a curvenet 420 is established for face deformation and is posed over the head of the character. In the third image 406, a curvenet 422 is established for mouth deformation and is posed over the mouth of the character. In the fourth image 408, a curvenet 424 is established for eye deformation and is posed over the eyes of the character. In the fifth image 410, a curvenet 426 is established for hair deformation and is posed over the hair of the character. Thus, the curvenets can be configured with different granularity and positioning as suitable for editing different parts of an item. These curvenets were authored with different layouts fitted to surface profiles, including curves resembling coarse cages (e.g., head and hair) versus partially connected and floating curves (e.g., lips and eyes).

As can be seen in images 404, 406, 408, 410, and 412, the deformations configured by the previous curvenet are applied to the character in the subsequent image. For example, edits to the cheek shape using curvenet 420 can be seen in image 406, edits to the mouth shape using curvenet 422 can be seen in image 408, and so forth. Image 412 shows the modified character after each applied curvenet modification.

Figure 5:
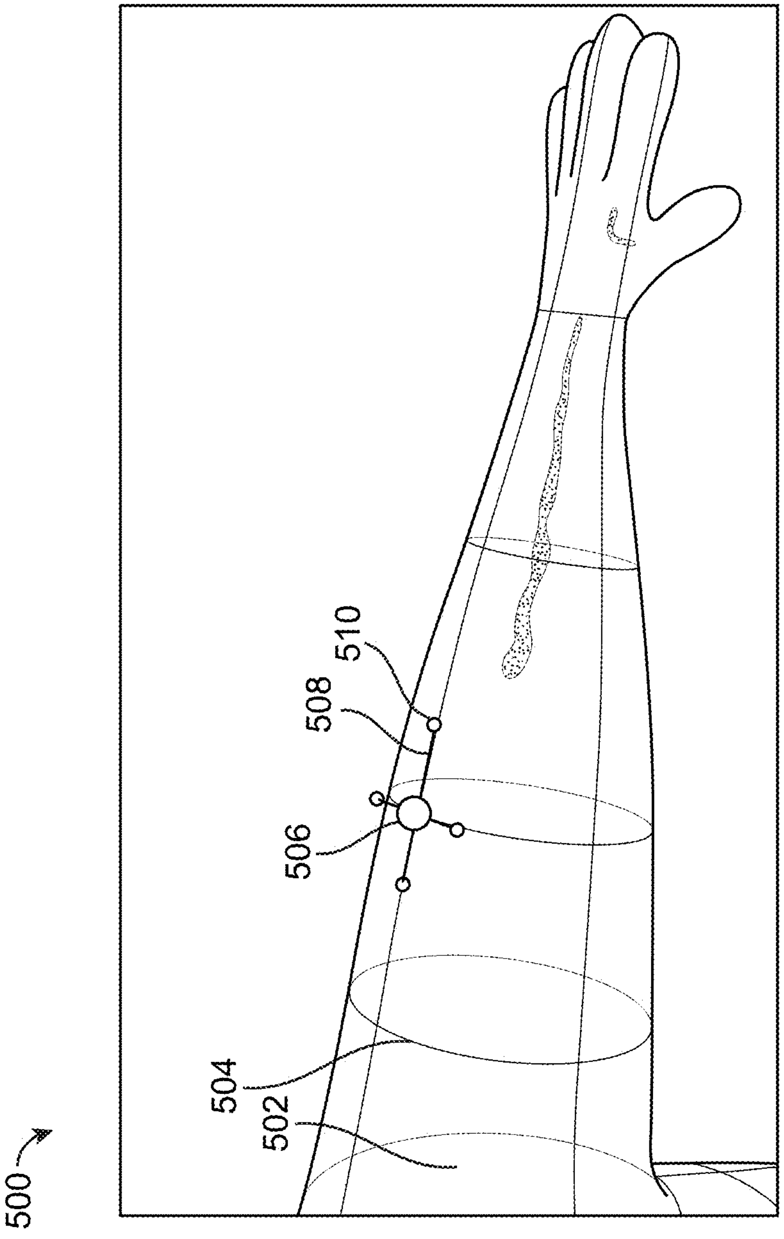
FIG. 5 illustrates a control object as used in the method of FIG. 3 according to some embodiments.
Figure 6:
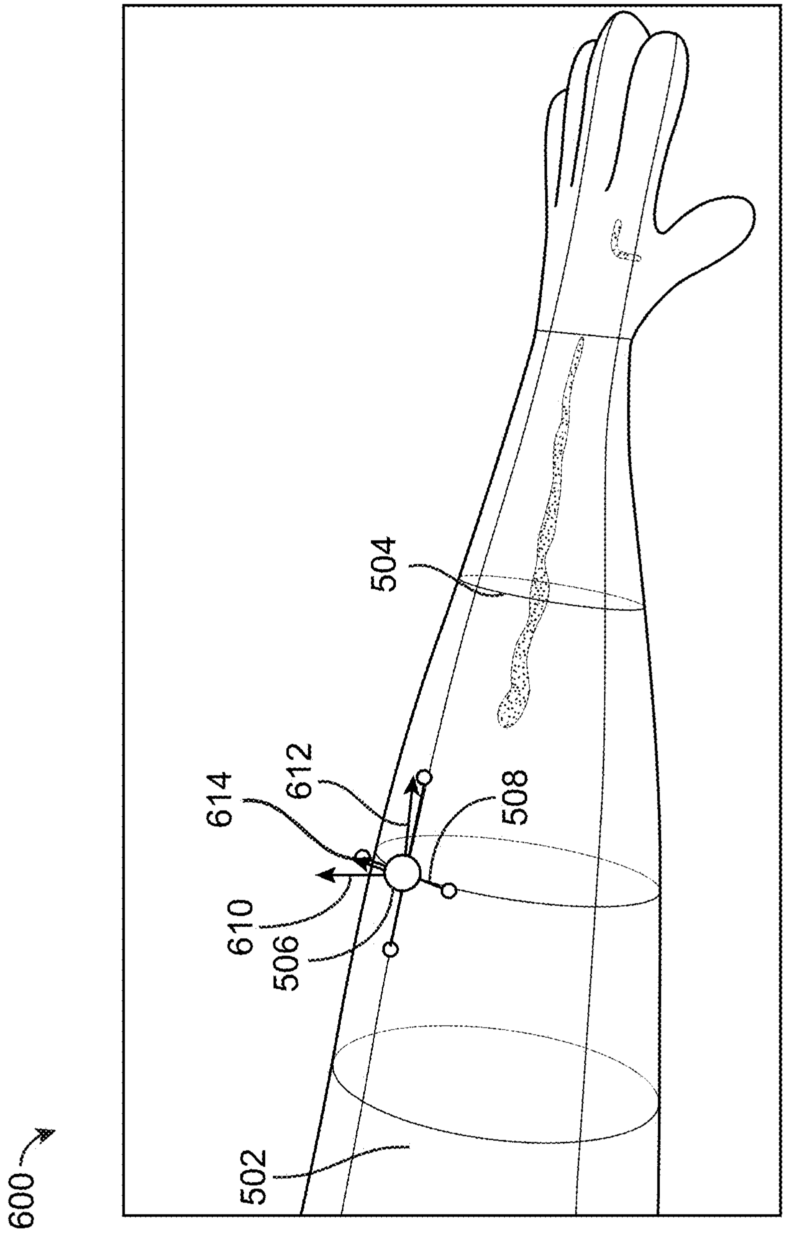
FIG. 6 illustrates a control object as used in the method of FIG. 3 according to some embodiments.
Figure 7:
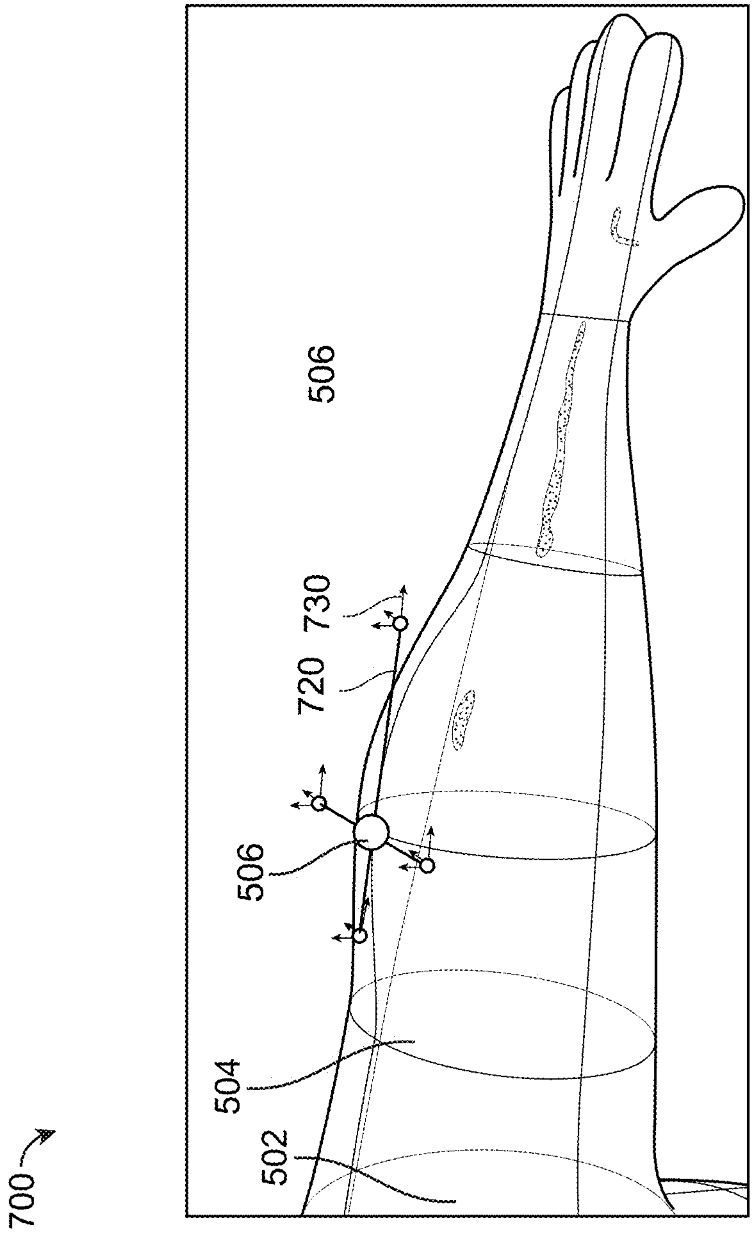
FIG. 7 illustrates a control object as used in the method of FIG. 3 according to some embodiments.

FIGS. 5-7 show a sequence of images 500, 600, and 700 illustrating a close-up view of an item 502 with a curvenet 504 and control object 506. In this example, the item 502 is a humanoid character, zoomed in to show the arm. The curvenet 504 loosely defines the surface of the item 502. The control object 506 is positioned on the curvenet 504.

FIG. 5 represents an initial configuration of the control object 506. As described above, the control object 506 is generated at a point on the curvenet. For instance, referring to FIG. 4, an animator can select one of the points 414 on the curvenet and the system will generate a control object at that point. If the curvenet is comprised of Bézier splines, the control object 506 includes a set of tangent bars 508 terminating in tangent points 510.

FIG. 6 represents a second configuration of the control object 506. The control object 506 has been modified to include handles 610, 612, and 614, which can be manipulated to move the control object overall. For example, the user selects the center point of the control object 506. Responsive to detecting the selection of the center point, the computer system generates the handles. The three handles in aggregate can be used to move the point in any direction in 3D space. Each of the handles 610, 612, and 614 is in an initial position. A user can select a handle (e.g., 610, 612, or 614) to control manipulation of the curvenet parameters. For instance, the translation of each handle (e.g., 610, 612, or 614) is initially set to 0 in each direction. If the user pulls a handle in a particular direction, the control point of the curvenet is moved in that direction, acting as a new target of interpolation for the curves including the point of interest. As described above with respect to FIG. 3, based on the user-configured parameters associated with the point using the control object, the curvenet is adjusted to reflect the new parameters, and in turn the surface mesh is adjusted to reflect the new parameters.

FIG. 7 represents a third configuration of the control object 506. The control object 506 includes a modified set of handles. The right-most handle 720 has been extended. In some implementations, the user manipulations of the handle control the curvature of the curve that includes the point of interest. For example, when the handle is lengthened, the curvature increases, and when the handle is shortened, the curvature decreases. These handles can also be rotated to grab and change the shape.

As shown in FIG. 7, the tangent points themselves have handles 730 that can move them in any direction in 3D space. There can also be rotational handles on the main point of the control object 506, which can be used to rotate the tangent point around the main point.

B. Example Interface for Manipulating Curvenet Controls

FIG. 8 illustrates an example interface 800 for manipulating curvenet controls according to various embodiments. As shown in FIG. 8 the interface 800 is a graphical user interface that displays information for configuring an item for animation. On the left side, the interface 800 displays an item 802 with a curvenet 804 and control object 806, including tangent points 808 and 809 and handles 810 and 812, which are similar to those described above with respect to FIGS. 5 and 6.

On the right side, the interface 800 displays control parameters 820 for the control object 806. The control object name 822 is LElbowOut_adjmt, the x translation 824 $T_x$ is −0.45018, the y translation 826 $T_y$ is 0.09829, the z translation 828 $T_z$ is 2.82264, and so forth. Also displayed are values for x rotation 830 $R_x$, y rotation 832 $R_y$, z rotation 834 $R_z$, x scale 836 $S_x$, y scale 838 $S_y$, and z scale 840 $S_z$. Thus, in some aspects, the interface 800 displays the item, the control object, and associated values including a name of the point and an associated plurality of translation values and rotation values. As the user manipulates the control object 806, the interface 800 displays the updated values for the control parameters 820 for the selected point. These values are used by the computing system to represent the modified curvenet.

C. Example Results

Figure 9:
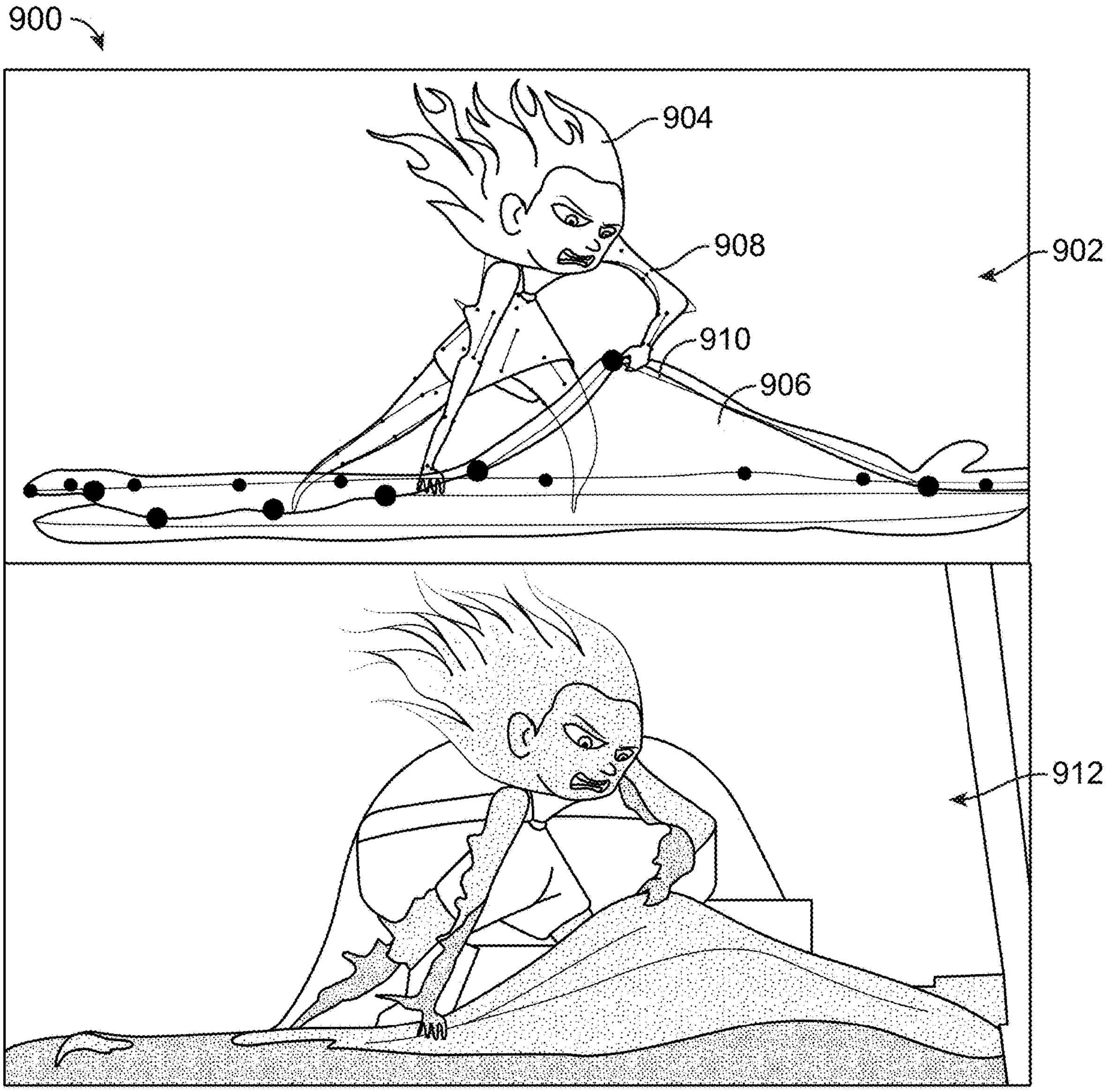
FIG. 9 illustrates an example result of configuring animation using curvenet controls, according to some embodiments.

FIG. 9 illustrates example results 900 according to various embodiments. The top image 902 shows items 904 and 906 that are adjusted by an animator using curvenets 908 and 910. The bottom image 912 shows the final rendered frame based on the configured parameters.

IV. Computer Systems

FIG. 10 is a simplified block diagram of system 1000 for creating computer graphics imagery (CGI) and computer-aided animation that may implement or incorporate various embodiments. In this example, system 1000 can include one or more design computers 1010, object library 1020, one or more object modeling systems 1030, one or more object articulation systems 1040, one or more object animation systems 1050, one or more object simulation systems 1060, and one or more object rendering systems 1070. Any of the systems 1030-1070 may be invoked by or used directly by a user of the one or more design computers 1010 and/or automatically invoked by or used by one or more processes associated with the one or more design computers 1010. Any of the elements of system 1000 can include hardware and/or software elements configured for specific functions.

The one or more design computers 1010 can include hardware and software elements configured for designing CGI and assisting with computer-aided animation. Each of the one or more design computers 1010 may be embodied as a single computing device or a set of one or more computing devices. Some examples of computing devices are PCs, laptops, workstations, mainframes, cluster computer system, grid computer systems, cloud computer systems, embedded devices, computer graphics devices, gaming devices and consoles, consumer electronic devices having programmable processors, or the like. The one or more design computers 1010 may be used at various stages of a production process (e.g., pre-production, designing, creating, editing, simulating, animating, rendering, post-production, etc.) to produce images, image sequences, motion pictures, video, audio, or associated effects related to CGI and animation.

In one example, a user of the one or more design computers 1010 acting as a modeler may employ one or more systems or tools to design, create, or modify objects within a computer-generated scene. The modeler may use modeling software to sculpt and refine a neutral 3D model to fit predefined aesthetic needs of one or more character designers. The modeler may design and maintain a modeling topology conducive to a storyboarded range of deformations. In another example, a user of the one or more design computers 1010 acting as an articulator may employ one or more systems or tools to design, create, or modify controls or animation variables (avers) of models. In general, rigging is a process of giving an object, such as a character model, controls for movement, therein "articulating" its ranges of motion. The articulator may work closely with one or more animators in rig building to provide and refine an articulation of the full range of expressions and body movement needed to support a character's acting range in an animation. In a further example, a user of design computer 1010 acting as an animator may employ one or more systems or tools to specify motion and position of one or more objects over time to produce an animation.

Object library 1020 can include elements configured for storing and accessing information related to objects used by the one or more design computers 1010 during the various stages of a production process to produce CGI and animation. Some examples of object library 1020 can include a file, a database, or other storage devices and mechanisms. Object library 1020 may be locally accessible to the one or more design computers 1010 or hosted by one or more external computer systems.

Some examples of information stored in object library 1020 can include an object itself, metadata, object geometry, object topology, rigging, control data, animation data, animation cues, simulation data, texture data, lighting data, shader code, or the like. An object stored in object library 1020 can include any entity that has an n-dimensional (e.g., 2D or 3D) surface geometry. The shape of the object can include a set of points or locations in space (e.g., object space) that make up the object's surface. Topology of an object can include the connectivity of the surface of the object (e.g., the genus or number of holes in an object) or the vertex/edge/face connectivity of an object.

The one or more object modeling systems 1030 can include hardware and/or software elements configured for modeling one or more objects. Modeling can include the creating, sculpting, and editing of an object. In various embodiments, the one or more object modeling systems 1030 may be configured to generate a model to include a description of the shape of an object. The one or more object modeling systems 1030 can be configured to facilitate the creation and/or editing of features, such as non-uniform rational B-splines or NURBS, polygons and subdivision surfaces (or SubDivs), that may be used to describe the shape of an object. In general, polygons are a widely used model medium due to their relative stability and functionality. Polygons can also act as the bridge between NURBS and SubDivs. NURBS are used mainly for their ready-smooth appearance and generally respond well to deformations. SubDivs are a combination of both NURBS and polygons representing a smooth surface via the specification of a coarser piecewise linear polygon mesh. A single object may have several different models that describe its shape.

The one or more object modeling systems 1030 may further generate model data (e.g., 2D and 3D model data) for use by other elements of system 1000 or that can be stored in object library 1020. The one or more object modeling systems 1030 may be configured to allow a user to associate additional information, metadata, color, lighting, rigging, controls, or the like, with all or a portion of the generated model data.

The one or more object articulation systems 1040 can include hardware and/or software elements configured to articulating one or more computer-generated objects. Articulation can include the building or creation of rigs, the rigging of an object, and the editing of rigging. In various embodiments, the one or more articulation systems 1040 can be configured to enable the specification of rigging for an object, such as for internal skeletal structures or eternal features, and to define how input motion deforms the object. One technique is called "skeletal animation," in which a character can be represented in at least two parts: a surface representation used to draw the character (called the skin) and a hierarchical set of bones used for animation (called the skeleton).

The one or more object articulation systems 1040 may further generate articulation data (e.g., data associated with controls or animations variables) for use by other elements of system 1000 or that can be stored in object library 1020. The one or more object articulation systems 1040 may be configured to allow a user to associate additional information, metadata, color, lighting, rigging, controls, or the like, with all or a portion of the generated articulation data.

The one or more object animation systems 1050 can include hardware and/or software elements configured for animating one or more computer-generated objects. Animation can include the specification of motion and position of an object over time. The one or more object animation systems 1050 may be invoked by or used directly by a user of the one or more design computers 1010 and/or automatically invoked by or used by one or more processes associated with the one or more design computers 1010.

In various embodiments, the one or more animation systems 1050 may be configured to enable users to manipulate controls or animation variables or utilized character rigging to specify one or more key frames of animation sequence. The one or more animation systems 1050 generate intermediary frames based on the one or more key frames. In some embodiments, the one or more animation systems 1050 may be configured to enable users to specify animation cues, paths, or the like according to one or more predefined sequences. The one or more animation systems 1050 generate frames of the animation based on the animation cues or paths.

In further embodiments, the one or more animation systems 1050 may be configured to enable users to define animations using one or more animation languages, morphs, deformations, or the like.

The one or more object animations systems 1050 may further generate animation data (e.g., inputs associated with controls or animations variables) for use by other elements of system 1000 or that can be stored in object library 1020. The one or more object animations systems 1050 may be configured to allow a user to associate additional information, metadata, color, lighting, rigging, controls, or the like, with all or a portion of the generated animation data.

The one or more object simulation systems 1060 can include hardware and/or software elements configured for simulating one or more computer-generated objects. Simulation can include determining motion and position of an object over time in response to one or more simulated forces or conditions. The one or more object simulation systems 1060 may be invoked by or used directly by a user of the one or more design computers 1010 and/or automatically invoked by or used by one or more processes associated with the one or more design computers 1010.

In various embodiments, the one or more object simulation systems 1060 may be configured to enables users to create, define, or edit simulation engines, such as a physics engine or physics processing unit (PPU/GPGPU) using one or more physically-based numerical techniques. In general, a physics engine can include a computer program that simulates one or more physics models (e.g., a Newtonian physics model), using variables such as mass, velocity, friction, wind resistance, or the like. The physics engine may simulate and predict effects under different conditions that would approximate what happens to an object according to the physics model. The one or more object simulation systems 1060 may be used to simulate the behavior of objects, such as hair, fur, and cloth, in response to a physics model and/or animation of one or more characters and objects within a computer-generated scene.

The one or more object simulation systems 1060 may further generate simulation data (e.g., motion and position of an object over time) for use by other elements of system 1000 or that can be stored in object library 1020. The generated simulation data may be combined with or used in addition to animation data generated by the one or more object animation systems 1050. The one or more object simulation systems 1060 may be configured to allow a user to associate additional information, metadata, color, lighting, rigging, controls, or the like, with all or a portion of the generated simulation data.

The one or more object rendering systems 1070 can include hardware and/or software element configured for "rendering" or generating one or more images of one or more computer-generated objects. "Rendering" can include generating an image from a model based on information such as geometry, viewpoint, texture, lighting, and shading information. The one or more object rendering systems 1070 may be invoked by or used directly by a user of the one or more design computers 1010 and/or automatically invoked by or used by one or more processes associated with the one or more design computers 1010. One example of a software program embodied as the one or more object rendering systems 1070 can include PhotoRealistic RenderMan, or PRMan, produced by Pixar Animations Studios of Emeryville, California.

In various embodiments, the one or more object rendering systems 1070 can be configured to render one or more objects to produce one or more computer-generated images or a set of images over time that provide an animation. The one or more object rendering systems 1070 may generate digital images or raster graphics images.

In various embodiments, a rendered image can be understood in terms of a number of visible features. Some examples of visible features that may be considered by the one or more object rendering systems 1070 may include shading (e.g., techniques relating to how the color and brightness of a surface varies with lighting), texture-mapping (e.g., techniques relating to applying detail information to surfaces or objects using maps), bump-mapping (e.g., techniques relating to simulating small-scale bumpiness on surfaces), fogging/participating medium (e.g., techniques relating to how light dims when passing through non-clear atmosphere or air) shadows (e.g., techniques relating to effects of obstructing light), soft shadows (e.g., techniques relating to varying darkness caused by partially obscured light sources), reflection (e.g., techniques relating to mirror-like or highly glossy reflection), transparency or opacity (e.g., techniques relating to sharp transmissions of light through solid objects), translucency (e.g., techniques relating to highly scattered transmissions of light through solid objects), refraction (e.g., techniques relating to bending of light associated with transparency), diffraction (e.g., techniques relating to bending, spreading and interference of light passing by an object or aperture that disrupts the ray), indirect illumination (e.g., techniques relating to surfaces illuminated by light reflected off other surfaces, rather than directly from a light source, also known as global illumination), caustics (e.g., a form of indirect illumination with techniques relating to reflections of light off a shiny object, or focusing of light through a transparent object, to produce bright highlights on another object), depth of field (e.g., techniques relating to how objects appear blurry or out of focus when too far in front of or behind the object in focus), motion blur (e.g., techniques relating to how objects appear blurry due to high-speed motion, or the motion of the camera), non-photorealistic rendering (e.g., techniques relating to rendering of scenes in an artistic style, intended to look like a painting or drawing), or the like.

The one or more object rendering systems 1070 may further render images (e.g., motion and position of an object over time) for use by other elements of system 1000 or that can be stored in object library 1020. The one or more object rendering systems 1070 may be configured to allow a user to associate additional information or metadata with all or a portion of the rendered image.

FIG. 11 is a block diagram of computer system 1100. FIG. 11 is merely illustrative. In some embodiments, a computer system includes a single computer apparatus, where the subsystems can be the components of the computer apparatus. In other embodiments, a computer system can include multiple computer apparatuses, each being a subsystem, with internal components. Computer system 1100 and any of its components or subsystems can include hardware and/or software elements configured for performing methods described herein.

Computer system 1100 may include familiar computer components, such as one or more one or more data processors or central processing units (CPUs) 1105, one or more graphics processors or graphical processing units (GPUs) 1110, memory subsystem 1115, storage subsystem 1120, one or more input/output (I/O) interfaces 1125, communications interface 1130, or the like. Computer system 1100 can include system bus 1135 interconnecting the above components and providing functionality, such connectivity and inter-device communication.

The one or more data processors or central processing units (CPUs) 1105 can execute logic or program code or for providing application-specific functionality. Some examples of CPU(s) 1105 can include one or more microprocessors (e.g., single core and multi-core) or micro-controllers, one or more field-gate programmable arrays (FPGAs), and application-specific integrated circuits (ASICs). As user herein, a processor includes a multi-core processor on a same integrated chip, or multiple processing units on a single circuit board or networked.

The one or more graphics processor or graphical processing units (GPUs) 1110 can execute logic or program code associated with graphics or for providing graphics-specific functionality. GPUs 1110 may include any conventional graphics processing unit, such as those provided by conventional video cards. In various embodiments, GPUs 1110 may include one or more vector or parallel processing units. These GPUs may be user programmable, and include hardware elements for encoding/decoding specific types of data (e.g., video data) or for accelerating 2D or 3D drawing operations, texturing operations, shading operations, or the like. The one or more graphics processors or graphical processing units (GPUs) 1110 may include any number of registers, logic units, arithmetic units, caches, memory interfaces, or the like.

Memory subsystem 1115 can store information, e.g., using machine-readable articles, information storage devices, or computer-readable storage media. Some examples can include random access memories (RAM), read-only-memories (ROMS), volatile memories, non-volatile memories, and other semiconductor memories. Memory subsystem 1115 can include data and program code 1140.

Storage subsystem 1120 can also store information using machine-readable articles, information storage devices, or computer-readable storage media. Storage subsystem 1120 may store information using storage media 1145. Some examples of storage media 1145 used by storage subsystem 1120 can include floppy disks, hard disks, optical storage media such as CD-ROMS, DVDs and bar codes, removable storage devices, networked storage devices, or the like. In some embodiments, all or part of data and program code 1140 may be stored using storage subsystem 1120.

The one or more input/output (I/O) interfaces 1125 can perform I/O operations. One or more input devices 1150 and/or one or more output devices 1155 may be communicatively coupled to the one or more I/O interfaces 1125. The one or more input devices 1150 can receive information from one or more sources for computer system 1100. Some examples of the one or more input devices 1150 may include a computer mouse, a trackball, a track pad, a joystick, a wireless remote, a drawing tablet, a voice command system, an eye tracking system, external storage systems, a monitor appropriately configured as a touch screen, a communications interface appropriately configured as a transceiver, or the like. In various embodiments, the one or more input devices 1150 may allow a user of computer system 1100 to interact with one or more non-graphical or graphical user interfaces to enter a comment, select objects, icons, text, user interface widgets, or other user interface elements that appear on a monitor/display device via a command, a click of a button, or the like.

The one or more output devices 1155 can output information to one or more destinations for computer system 1100. Some examples of the one or more output devices 1155 can include a printer, a fax, a feedback device for a mouse or joystick, external storage systems, a monitor or other display device, a communications interface appropriately configured as a transceiver, or the like. The one or more output devices 1155 may allow a user of computer system 1100 to view objects, icons, text, user interface widgets, or other user interface elements. A display device or monitor may be used with computer system 1100 and can include hardware and/or software elements configured for displaying information.

Communications interface 1130 can perform communications operations, including sending and receiving data. Some examples of communications interface 1130 may include a network communications interface (e.g., Ethernet, Wi-Fi, etc.). For example, communications interface 1130 may be coupled to communications network/external bus 1160, such as a computer network, a USB hub, or the like. A computer system can include a plurality of the same components or subsystems, e.g., connected together by communications interface 1130 or by an internal interface. In some embodiments, computer systems, subsystem, or apparatuses can communicate over a network. In such instances, one computer can be considered a client and another computer a server, where each can be part of a same computer system. A client and a server can each include multiple systems, subsystems, or components.

Computer system 1100 may also include one or more applications (e.g., software components or functions) to be executed by a processor to execute, perform, or otherwise implement techniques disclosed herein. These applications may be embodied as data and program code 1140. Additionally, computer programs, executable computer code, human-readable source code, shader code, rendering engines, or the like, and data, such as image files, models including geometrical descriptions of objects, ordered geometric descriptions of objects, procedural descriptions of models, scene descriptor files, or the like, may be stored in memory subsystem 1115 and/or storage subsystem 1120.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g., a hard drive, a CD, or an entire computer system), and may be present on or within different computer products within a system or network. A computer system may include a monitor, printer, or other suitable display for providing any of the results mentioned herein to a user.

Any of the methods described herein may be totally or partially performed with a computer system including one or more processors, which can be configured to perform the steps. Thus, embodiments can be directed to computer systems configured to perform the steps of any of the methods described herein, potentially with different components performing a respective step or a respective group of steps. Although presented as numbered steps, steps of methods herein can be performed at a same time or in a different order. Additionally, portions of these steps may be used with portions of other steps from other methods. Also, all or portions of a step may be optional. Additionally, any of the steps of any of the methods can be performed with modules, circuits, or other means for performing these steps.

The specific details of particular embodiments may be combined in any suitable manner without departing from the spirit and scope of embodiments of the invention. However, other embodiments of the invention may be directed to specific embodiments relating to each individual aspect, or specific combinations of these individual aspects.

The above description of exemplary embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated.

A recitation of “a”, “an” or “the” is intended to mean “one or more” unless specifically indicated to the contrary.

All patents, patent applications, publications, and descriptions mentioned here are incorporated by reference in their entirety for all purposes. None is admitted to be prior art.

What is claimed is:

1. A method of providing an animation control, the method comprising:

obtaining a set of profile curves defining a surface of an item;

displaying the set of profile curves on a user interface;

detecting, via the user interface, a selection of a point on the set of profile curves;

based on detecting the selection of the point, generating a control object configured for deforming the set of profile curves, the control object being associated with the point, a plurality of translation values, and a plurality of rotation values;

detecting a user interaction with the control object;

based on the user interaction with the control object, deforming the set of profile curves by applying changes to one or more of the plurality of translation values and the plurality of rotation values; and based on the deformation of the set of profile curves, deforming a corresponding surface mesh for generating an animation of the item, wherein the user interface is a graphical user interface that displays the item, the control object, a name of the point, the plurality of translation values, and the plurality of rotation values.

2. The method of claim 1, wherein the profile curves comprise a set of cubic Bézier splines.

3. The method of claim 1, wherein the control object is further associated with a plurality of scale values.

4. The method of claim 1, wherein the user interaction with the control object comprises dragging a handle of the control object to a desired position.

5. The method of claim 1, wherein the user interaction with the control object comprises rotating a handle of the control object to rotate a tangent point around the point.

6. The method of claim 1, further comprising:

displaying the updated plurality of translation and rotation values via the user interface.

7. The method of claim 1, wherein the control object includes a set of tangent bars terminating in tangent points.

8. The method of claim 1, wherein the control object is generated in real time upon detecting selection of the point.

9. The method of claim 1, wherein the item is a character and wherein the surface mesh defines body parts of the character.

10. A system for performing animation, the system comprising one or more processors configured to:

obtaining a set of profile curves defining a surface of an item;

displaying the set of profile curves on a user interface;

detecting, via the user interface, a selection of a point on the set of profile curves;

based on detecting the selection of the point, generating a control object configured for deforming the set of profile curves, the control object being associated with the point, a plurality of translation values, and a plurality of rotation values;

detecting a user interaction with the control object;

based on the user interaction with the control object, deforming the set of profile curves by applying changes to one or more of the plurality of translation values and the plurality of rotation values; and based on the deformation of the set of profile curves, deforming a corresponding surface mesh for generating an animation of the item, wherein the user interface is a graphical user interface that displays the item, the control object, a name of the point, the plurality of translation values, and the plurality of rotation values.

11. The system of claim 10, the profile curves comprise a set of cubic Bézier splines.

12. The system of claim 10, wherein the control object is further associated with a plurality of scale values.

13. The system of claim 10, wherein the user interaction with the control object comprises dragging a handle of the control object to a desired position.

14. The system of claim 10, wherein the user interaction with the control object comprises rotating a handle of the control object to rotate a tangent point around the point.

15. The system of claim 10, wherein the one or more processors are further configured to:

display the updated plurality of translation and rotation values via the user interface.

16. The system of claim 10, wherein the control object includes a set of tangent bars terminating in tangent points.

17. The system of claim 10, wherein the control object is generated in real time upon detecting selection of the point.

18. The system of claim 10, wherein the item is a character and wherein the surface mesh defines body parts of the character.

* * * * *